Figure 1:
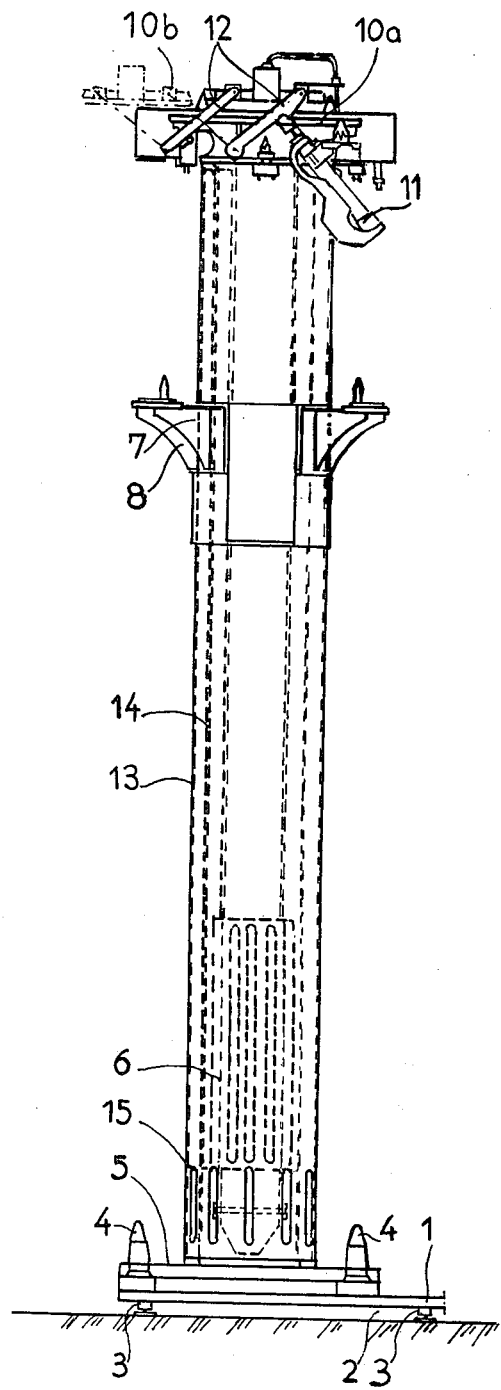

United States Patent [19]

Bellaiche et al.

[11] 4,225,388
[45] Sep. 30, 1980

[54] CRACK DETECTION CELL FOR CHECKING THE LEAKPROOFNESS OF FUEL ELEMENT UNITS

[75] Inventors: Hubert Bellaiche, Fontenay aux Roses; Vladimir Zecevic, Velizy, both of France

[73] Assignee: Societe Franco-Americaine de Constructions Atomiques Framatome, Courbevoie, France

[21] Appl. No.: 901,007

[22] Filed: Apr. 27, 1978

[30] Foreign Application Priority Data

Apr. 29, 1977 [FR] France ................................ 77 12938

[51] Int. Cl.² ............................................ G21C 17/00
[52] U.S. Cl. ............................................. 176/19 LD
[58] Field of Search .................................. 176/19 LD

[56] References Cited

U.S. PATENT DOCUMENTS

| 3,234,101 | 2/1966 | Berthod | 176/19 LD |
|---|---|---|---|
| 3,419,467 | 12/1968 | Holzer et al. | 176/19 LD |
| 3,947,318 | 3/1976 | Zhuchkov et al. | 176/19 LD |
| 3,983,741 | 10/1976 | Honig et al. | 176/19 LD |
| 4,034,599 | 7/1977 | Osborne | 176/19 LD |
| 4,039,376 | 8/1977 | Wachter | 176/19 LD |
| 4,072,559 | 2/1978 | Neidl et al. | 176/19 LD |
| 4,082,607 | 4/1978 | Dirowa | 176/19 LD |

FOREIGN PATENT DOCUMENTS 5012078  6/1970  Japan .................................. 176/19 LD

*Primary Examiner*—Samuel W. Engle
*Assistant Examiner*—S. A. Cangialosi
*Attorney, Agent, or Firm*—Haseltine, Lake & Waters

[57] ABSTRACT

In the detection of cracks in fuel element units using a crack detection cell, the cell includes heating means which are energized to heat the unit. The heating means form part of a pocket in which the unit is received, the pocket being received in a double-walled chamber which can be thermally insulated from the surrounding medium.

3 Claims, 2 Drawing Figures

U.S. Patent  Sep. 30, 1980  4,225,388

CRACK DETECTION CELL FOR CHECKING THE LEAKPROOFNESS OF FUEL ELEMENT UNITS

The invention relates to a crack detection cell for checking the leakproofness of fuel element units in the deactivation swimming-pool of a nuclear reactor, and the corresponding process of checking.

When the core of a nuclear reactor is recharged with fuel element units which have been in the reactor for a certain period, it is necessary to check the leakproofness of these units in order to avoid introducing into the reactor units suffering from leakages due to cracks in the sheathing material of the fuel elements. Equally, if used units are transferred to the retreatment factory, it is necessary to know the level of $\gamma$-activity released by these units so as to take the necessary precautions to avoid contamination. It is thus necessary to carry out a rapid detection of crack faults, on irradiated fuel units, on site at the time of discharging, and at the time of charging, the core of the reactor.

One of the processes most used to carry out this rapid detection is a method of crack detection which consists of measuring the activity of fluids which have been in contact with the fuel unit during a rise in temperature of the fuel unit.

During a rise in temperature of the fuel unit, the fission gases contained in the fuel elements expand and their speed of release through cracks in the sheaths increases so that volatile or water-soluble fission products increasingly contaminate the medium surrounding the unit.

In this process, crack detection cells which are generally located in the deactivation swimming pool of the reactor are used. The fuel unit is located in a pocket, containing water, inside the crack detection cell.

When the temperature of the fuel unit rises, the fission products are released into the water in which the fuel unit is immersed. Taking samples and measuring the $\gamma$-activity of this water thus makes it possible to check the leakproofness of the fuel units.

In order to achieve a rise in temperature of the fuel unit, a heat barrier is generally created between the pocket in which the fuel unit is located, and the water of the deactivation swimming pool, which is then no longer able to absorb the heat evolved by the fuel unit.

To produce this heat barrier, the pocket intended to receive the fuel unit is generally located inside a double-walled chamber which rests vertically on the bottom of the deactivation swimming pool, and which has, in its external wall, orifices by which the gap between the walls of the chamber is connected with the swimming pool. This gap between the two walls of the chamber is connected to a feed line for inert gas under pressure from which gas under pressure passes into the gap and forces out the water of the deactivation swimming pool, to create the heat barrier.

This system is particularly suitable in the case of fuel units which have to be checked shortly after discharge from the reactor core, the latter having functioned for a normal period of time, that is to say it is suitable for units which have a high residual power. In contrast, in the case of units of low residual power, that is to say fuel units which are checked long after discharge from the reactor, or following premature stoppage of the reactor, the rise in temperature of the unit becomes very slow so that the utilisation times increase considerably, which can make the system completely inapplicable.

The above described process is in effect based on a comparison of the measurements of the $\gamma$-activity in the water surrounding the fuel unit before and after the rise in temperature of the unit. The difference in activity is thus a function of the extent of the temperature rise of the unit.

In order to treat a larger number of fuel units within a given time, it has been proposed to use a large number of crack detection cells simultaneously, but it is then necessary to provide the corresponding space in the deactivation swimming pool.

It has also been proposed to empty the water from the pocket so as to allow a rapid rise in temperature of the fuel unit. However, this technique is difficult to master and suffers from certain dangers.

On the other hand, in all the known processes the activity is measured on samples of fluids treated manually, which further increases the duration of use.

According to one aspect of the invention there is provided a crack detection cell for checking the leakproofness of a fuel element unit in the deactivation swimming pool of a nuclear reactor, by measuring the $\gamma$-activity of fluids in contact with the fuel unit, said cell comprising:

a double-walled chamber for resting vertically on the bottom of the deactivation swimming pool, the external wall of said chamber defining orifices which connect the gap between said walls of said chamber with the swimming pool;

means for connecting said gap to a source of gas under pressure for creating a heat barrier between the interior of said chamber and the deactivation swimming pool;

a leakproof pocket for receiving a fuel unit in a vertical position, said pocket being located inside said chamber and comprising an upper part for serving as a zone for introducing said unit and a leakproof cover for closing said pocket;

means for introducing water into, and for removing water from, said pocket; and heating means located at the lower part of said pocket and forming part of the internal surface of said pocket and for heating water contained in said pocket by direct contact to cause a rise in temperature of a fuel element when in said pocket.

Preferably, the crack detection cell according to the invention includes means for circulating an inert gas in the pocket, and means, included in said circulation means, for continuously measuring the $\gamma$-activity of the gas which has passed through the water contained in said pocket, in which the fuel element is immersed.

According to another aspect of the invention there is provided a process for checking the leakproofness of a fuel element unit, using a crack detection cell as described above, comprising:

causing circulation of inert gas in said pocket containing water in which said fuel unit is immersed, so as to entrain any fission products released by said fuel unit;

and continuously measuring the activity of said circulating gas;

thermally isolating said pocket containing said unit and energising said heating plates surrounding said pocket for a part of the time for which said gas is circulated; and checking the leakproofness of said unit by comparing the measurements of the activity of said circulating gas when said unit is not thermally isolated and heated and when said unit is both thermally isolated and heated.

The invention will be more fully understood from the following description of an embodiment thereof, given by way of example only, with reference to the accompanying drawing.

Figure 2:
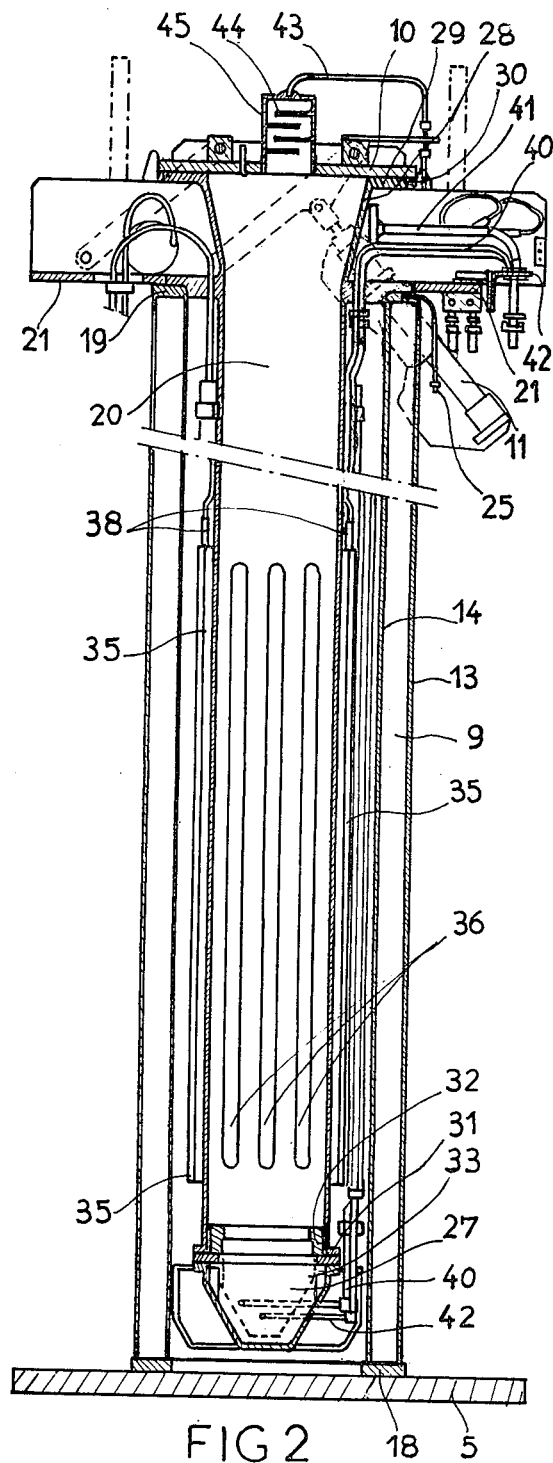

In the drawing:

FIG. 1 is an elevational view of an embodiment of a cell in accordance with the invention and located in the deactivation swimming pool of a reactor; and FIG. 2 is a cross-section along a vertical plane which passes through the axis of the cell shown in FIG. 1.

As shown in the drawing an adapter plate 1 rests on the bottom of a swimming pool 2 by means of jacks 3 which allow adjustment of the horizontal alignment of the adapter plate 1.

The adapter plate carries centering pegs 4 on which engage orifices machined in a support plate 5 on which a crack detection cell 6 rests. Holding arms 7 are fixed to the external surface of the cell and make it possible to connect the upper part of the cell to the upper part of storage racks which are not shown in FIG. 1. Arms 8 also make it possible to lift and hold the crack detection cell.

The upper part of the crack detection cell is located below the level of the water in the swimming pool and possesses a cover 10 which can be manoeuvred so as to move parallel to itself, by means of an actuating jack 11. The body of the jack 11 is fixed to the external wall of the crack detection cell and to small linkage rods 12 hinged at one of their ends to the cover and at their other ends to the crack detection cell. The piston rod of the jack 11 is fixed to one of the linkage rods 12.

In FIG. 1, the cover 10 is shown in its closed position 10a and in broken lines in its open position 10b.

The cell comprises a chamber 9 defined by two coaxial tubes or walls 13 and 14. The external wall 13 of the chamber 9 possesses, at its base, slots or orifices 15 which allow the water of the deactivation swimming pool to penetrate into a gap between the walls 13 and 14.

The coaxial walls or tubes 13 and 14 defining the chamber 9 are connected at their lower ends by a ring 18 fixed on to the support plate 5 and at their upper ends by a ring 19 on which rests the upper part of a pocket 20 located in the chamber 9, via a flange 21. A pipeline 25 is connected to the upper part of the chamber 9 and opens into the gap between the tubular walls 13 and 14. The pipeline 25 is connected to a source (not shown) of inert gas under pressure via a valve which allows gas under pressure to be introduced into the gap so as to drive water out through the orifices 15 and produce a heat barrier between the interior of the chamber 9 and the water of the deactivation swimming pool.

The pocket 20 comprises a tube of square cross-section which is connected at its lower end to an end member 27 of pyramidal shape and is connected at its upper part to a member 28 in the shape of a truncated cone which is itself connected to a horizontal ring 29 which carries a gasket 30 on which the removable cover 10 rests. The lower end member 27 of the pocket is connected to the square cross-section tube by means of a ring 31 which carries gaskets. On to the ring 31 is fixed a support 32 for a fuel element unit, and a device 33 for recovering solid particles which may be detached from the unit whilst it is being checked.

In the lower part of the pocket, on each of the plane faces of the square cross-section tube, are located heating plates 35 which are each formed by a coil of coaxial heating cables set into a support plate. These plates 35, which have a unit power of 4 KVA, are removable so that they can be replaced rapidly in case of need.

At the level of the heating plates 35 the pocket 20 possesses slots 36 which allow direct contact between water contained in the pocket and the heating plates 35. The heating plates are fixed in a leakproof manner to the external walls of the pocket 20.

The flange 21, which is integral with the upper part of the pocket 20, carries, on one of its sides, the electrical connections which allow the heating plates to be supplied via conductors 38, and on its other side, the feed hoses for water and inert gas for circulation in the pocket.

These hoses consist of a water feed hose 40 which opens at the bottom of the pocket 20 into the pyramidal end member 27, and an inert gas feed hose 42 which also opens into the pyramidal end member 27 of the pocket 20.

The water leaves through a pipeline 41 which is connected to the frusto-conical upper member of the pocket 20.

The gas leaves through a pipeline 43 connected to a gas reservoir 45 which is fixed to the cover 10 and possesses a labyrinth 44.

The temperature of the water in the cell is controlled by three thermocouples located at the ends and at midheight of the cell and by two other thermocouples of which one is located on the water inlet hose 40 and the other on the water outlet pipeline 41.

The gas outlet and water outlet pipelines from the pocket are furthermore connected to devices which on the one hand allow samples of water to be taken for laboratory analysis and on the other hand allow a continuous measurement of the activity of the inert gas removed from the pocket. The gas and water circuits are also connected to pumps (not shown) which cause the water and the inert gas to circulate inside the pocket.

Equipment attached to the crack detection cell also comprises safety devices which trigger alarms if the temperature of the water in the pocket exceeds certain thresholds or if the pressure of this water, controlled by a manometer, assumes too high a value. It is obvious that several cells identical to those which have just been described can be used in parallel, in which case the equipment attached to these cells can be shared.

The checking of a fuel unit, carried out using the above described device, will now be described.

With the crack detection cell located in the deactivation swimming pool as shown in FIG. 1 and the cover 10 in its open position 10b, a fuel unit is brought to above the crack detection cell by means of the handling device of the nuclear reactor. The fuel unit is then placed in the pocket 20, the introduction of this unit being facilitated by the upper frusto-conical member 26 of the pocket. The cover 10 is then closed by means of actuating jacks remotely controlled from the operating floor and an inert gas blanket is set up above the unit immersed in the water filling the pocket. It should be noted that, at the start of the operation, the water of the deactivation swimming pool fills the gap between the internal and external walls of the chamber 9 and the gap between the internal wall 14 of this chamber and the pocket 20 through which the electrical feed lines and the inert gas and water feed tubes pass, and that the interior of the pocket is also filled with water.

The circulation of gas through the pipelines 42 and 43 and the γ-counting device for continuously measuring the activity of the circulating inert gas are then started.

After having run the circulation and the counting device without a rise in temperature of the unit, inert gas is passed through the pipeline 25 into the gap between the walls 13 and 14 of the chamber 9, which has the effect of forcing out the water of the deactivation swimming pool which had penetrated into the gap, through the slots 15 machined at the base of the crack detection cell. The heating plates are then fed with current and the rise in temperature of the unit now takes place rapidly due both to any residual power of the unit and to the heating plates.

In this way it is possible to achieve a rise in temperature of the order of 40° to 50° C. of the water inside the pocket within a relatively short time (of the order of 10 minutes). The thermal equilibrium between the water in the pocket and the unit itself is set up very rapidly and the rise in temperature of the unit makes it possible to considerably increase the sensitivity of the activity measurements.

When the measurements have been finished, the gas circulation is stopped and the residual gas which is present above the unit is removed.

All the measurements together have taken about fifteen minutes.

The cover 10 is now opened by actuating the jack 25 and the unit is withdrawn from the pocket by the lifting and handling means of the central control point. The crack detection cell is now washed by circulating water through the holes 40 and 41.

The gas which, during operation, circulates from the base of the pocket, where it is injected through the hose 42, to the top of the pocket, where it is taken up by the storage chamber 45 and the hose 43, makes it possible to entrain volatile fission products, in particular Xe 133, which have entered the water contained in the pocket through cracks in the fuel elements, and on which counts are carried out in the entrained gas.

The measurements of the γ-activity can also be carried out on the water-soluble products; in this case, a circulation of water is set up in the pocket in place of a circulation of inert gas and samples of water by a device provided for this purpose in the water circulation circuit, these samples being processed in the laboratory.

It is also possible to take samples of the circulating water systematically in order to check the results obtained by continuous measurement on the inert gas circulating in the pocket.

It will be seen that the principal advantages of the above described device are that increased sensitivity of detection is achieved by means of the increase in the temperature difference, the temperature at which the measurements were carried out can be kept constant from one unit to another by regulating the heating by means of heating plates, due to the increase in sensitivity the measurements can be carried out in the presence of a high background noise, measurements can be effected on units after several months of deactivation, for example after lengthy transportation for retreatment purposes, and, finally, the device permits optimum utilisation of the crack detection cell.

Additionally, the use of an isolated inert gas circuit, without sampling, for measuring the γ-activity, makes it possible to avoid irradiation and contamination hazards.

The invention is not intended to be limited to the embodiment which has just been described but comprises all the variants and it is possible to conceive modifications in points of detail without thereby going outside the scope of the invention.

Thus, while in the embodiment which has just been described, the heating plates are arranged against the external surface of the pocket, and the wall of the pocket possesses slots to ensure direct contact between the water contained in the pocket and the heating plates, the heating plates can alternatively be located inside the pocket. However this alternative arrangement is to be avoided if it is desired to be able to remove these heating plates easily. In place of a cover manipulated automatically by means of a jack, it is possible to use a manually manipulated cover for closing the pocket. Finally, it is possible to conceive the use of any inert gas, for example nitrogen or argon, for entraining the fission products.

What is claimed is:

1. A crack detection cell for checking the leakproofness of a fuel element in the deactivation swimming pool of a nuclear reactor, by measuring the gamma activity of fluids in contact with the fuel unit, said cell comprising:
   a double-walled chamber for resting vertically on the bottom of the deactivation swimming pool, the external wall of said chamber defining orifices which connect the gap between said walls of said chamber with the swimming pool;
   means for connecting said gap to a source of inert gas under pressure for creating a heat barrier between the interior of said chamber and the deactivation swimming pool;
   a leakproof pocket for receiving a fuel unit in a vertical position, said pocket being located inside said chamber and comprising an upper part for serving as a zone for introducing said unit and a leakproof cover for closing said pocket;
   means for introducing water into, and for removing water from, said pocket;
   heating means mounted on the lower part of said pocket and for heating water contained in said pocket by direct contact to cause a rise in temperature of a fuel element in said pocket;
   means for circulating said inert gas in said pocket; and
   means for continuously measuring the activity of the gas which has passed through the water contained in said pocket and in which the fuel element is immersed.

2. A cell according to claim 1 including means for controlling opening and closing of said cover comprising at least two small linkage rods each hinged at one end to said cover and at the other end to the upper part of said pocket, and a jack of which one part is fixed to said upper part of said pocket and the other part is hingedly connected to one of said linkage rods.

3. A process for checking the leakproofness of a fuel element unit, using a crack detection cell according to claim 1, comprising:
   causing circulation of inert gas in said pocket containing water in which said fuel unit is immersed, so as to entrain any fission products released by said fuel unit;
   and continuously measuring the activity of said circulating gas;
   thermally isolating said pocket containing said unit and energising said heating plates surrounding said pocket for a part of the time for which said gas is circulated; and
   checking the leakproofness of said unit by comparing the measurements of the activity of said circulating gas when said unit is not thermally isolated and heated and when said unit is both thermally isolated and heated.

* * * * *